(12) United States Patent
Sisco et al.

(10) Patent No.: US 10,495,130 B2
(45) Date of Patent: Dec. 3, 2019

(54) FASTENERS HAVING ENHANCED ELECTRICAL ENERGY DISPERSION PROPERTIES

(71) Applicant: The Boeing Company, Chicago, IL (US)

(72) Inventors: Tanni Sisco, Mukilteo, WA (US); Antonio Carlos Rufin, Seattle, WA (US); Richard B. Tanner, Seattle, WA (US); Dale Winter, Maple Valley, WA (US); Jeffrey Alan Wilkerson, Everett, WA (US); Joe Heeter, Seattle, WA (US)

(73) Assignee: The Boeing Company, Chicago, IL (US)

( * ) Notice: Subject to any disclaimer, the term of this patent is extended or adjusted under 35 U.S.C. 154(b) by 288 days.

(21) Appl. No.: 15/349,122

(22) Filed: Nov. 11, 2016

(65) Prior Publication Data

US 2018/0135683 A1    May 17, 2018

(51) Int. Cl.
*F16B 33/06*    (2006.01)
*C23C 4/00*    (2016.01)
*C25D 7/00*    (2006.01)

(52) U.S. Cl.
CPC ............... *F16B 33/06* (2013.01); *C23C 4/00* (2013.01); *C25D 7/00* (2013.01)

(58) Field of Classification Search
CPC ............. F16B 33/06; C23C 4/00; C25D 7/00
See application file for complete search history.

(56) References Cited

U.S. PATENT DOCUMENTS

| | | | |
|---|---|---|---|
| 2,518,468 | A | 8/1950 | Harding |
| 2,934,480 | A | 4/1960 | Slomin |
| 2,998,361 | A | 8/1961 | Kitamura |
| 3,075,896 | A | 1/1963 | Mcgraw et al. |
| 3,400,058 | A | 9/1968 | Chambers et al. |
| 3,407,903 | A | 10/1968 | Sansabrino |
| 3,831,213 | A | 8/1974 | Bedi |

(Continued)

FOREIGN PATENT DOCUMENTS

| | | |
|---|---|---|
| DE | 19840298 A1 | 3/2000 |
| DE | 202006008314 U1 | 8/2007 |

(Continued)

OTHER PUBLICATIONS

Claas Fritzen, French Search Report for French Patent Application No. 1361603 dated Jul. 16, 2014, 2 pages, French Patent Office.

(Continued)

*Primary Examiner* — Moshe Wilensky
(74) *Attorney, Agent, or Firm* — Duft & Bornsen, PC

(57) ABSTRACT

Systems and methods are provided for fabricating fasteners. One embodiment is an apparatus that includes a fastener. The fastener includes a head, a cylindrical shank that extends from the head and is dimensioned to engage in a fit with a corresponding hole, and a coating that is discontinuously speckled around a circumference of the shank and extends axially along the shank, leaving irregular portions of a surface of the shank exposed. The coating exhibits a higher lubricity than the surface, and the coating exhibits a higher dielectric withstand voltage than the surface.

8 Claims, 11 Drawing Sheets

(56) References Cited

U.S. PATENT DOCUMENTS

| | | | |
|---|---|---|---|
| 3,979,351 | A | 9/1976 | Sekhon |
| 3,983,304 | A | 9/1976 | Sekhon |
| 9,447,809 | B2 | 9/2016 | Regnard et al. |
| 2002/0051695 | A1 | 5/2002 | Friederich et al. |
| 2004/0131943 | A1 | 7/2004 | Brown et al. |
| 2004/0163740 | A1 | 8/2004 | Keener et al. |
| 2004/0247835 | A1 | 12/2004 | Keener |
| 2008/0075555 | A1 | 3/2008 | March et al. |
| 2010/0124472 | A1 | 5/2010 | Nguyen et al. |
| 2013/0183119 | A1 | 7/2013 | Grobecker et al. |
| 2015/0147136 | A1 | 5/2015 | Maurel et al. |
| 2015/0337885 | A1* | 11/2015 | Whitlock ............... B64D 45/02 411/411 |
| 2016/0169262 | A1 | 6/2016 | Regnard et al. |

FOREIGN PATENT DOCUMENTS

| | | |
|---|---|---|
| DE | 102010040338 A1 | 3/2012 |
| EP | 2947015 A1 | 11/2015 |
| FR | 1240657 A | 9/1960 |
| FR | 2215453 A1 | 8/1974 |
| FR | 2851580 A1 | 8/2004 |
| FR | 2855836 A1 | 12/2004 |
| FR | 3008754 A1 | 1/2013 |
| FR | 3013781 A1 | 5/2015 |
| GB | 2212580 A | 7/1989 |
| JP | S62119810 A | 6/1987 |
| JP | 2009030736 A1 | 2/2009 |
| JP | 2009127777 A | 6/2009 |
| WO | 2007122079 A1 | 11/2007 |
| WO | 2010088647 A1 | 8/2010 |
| WO | 2010105241 A1 | 9/2010 |
| WO | 2011050040 A1 | 4/2011 |
| WO | 2012118855 A2 | 9/2012 |
| WO | 2015007919 A1 | 1/2015 |
| WO | 2015007957 A1 | 1/2015 |

OTHER PUBLICATIONS

Claas Fritzen, French Written Opinion for French Patent Application No. 1361603 dated Aug. 21, 2014, 4 pages, French Patent Office.

French Patent Application Serial No. 1361603, Cover Letter (1 page) and attachment of Third Party Observations (10 pages) mailed Aug. 14, 2015 to Applicant Airbus by French Patent Office INPI.

French Patent Office, French Search Report for French Patent Application No. 1361603 dated Aug. 14, 2015.

International Search Report—PCT-EP2014-065647; dated Oct. 20, 2014.

Poll, Andreas, International Search Report for WO/2015/007919, dated Oct. 20, 2014, 2 pages, ISA European Patent Office.

Poll, Andreas, International Search Report for WO/2015/007957, dated Mar. 13, 2014, 6 pages, ISA European Patent Office.

Wei, Jingchao, "The effect of interference fit size on the fatigue life of bolted joints in composite laminates," Composites: Part B 53 (2013), 62-68.

Wang et al; Fatigue strength assessment of an interference fit of single-bolt, double shear lap composite bolted joints; Record 3 from Compendex, compilation and indexing terms; 2016 Elsevier Inc.

Danlong Song; Micromechanical analysis for microscopic damage initiation in fiber/epoxy composite during interference-fit pin installation; Materials & Design; Jan. 2016 vol. 89 p. 36-49. 14p (Abstract only).

Juan et al; Effect of joint parameters, patterns and interference on the bolt loading in composite multi-bolt joints; Record 25 from Compendex; Compilation and indexing terms 2016 Elsevier Inc. (Search results only).

Yuanxin et al; Analysis of bolt-to-laminate interface friction in bolted composite joint with interference-fit; Compendex, Compilation and indexing terms 2016 Elsevier Inc. (Abstract only).

Lui; Influence of bolt-hole interference fit conditions on load capacity in compostie mechanical joints; Comendex, Compilation and indexing terms 2016 Elservier Inc. (Abstract only).

Wei et al; Bearing strength of compostie joints interference-fitted with blind bolts; Compendex, Compilation and indexing terms 2016 Elsevier Inc. (Abstract only).

EP Search Report; NL 2017955; dated Jun. 27, 2017.

European Search Report; Application 17199481.7-1010; dated Apr. 13, 2018.

European Search Report; Application 19152747.2-1010; dated May 13, 2019.

Japanese Office Action; Application 2017-176342; dated May 21, 2019.

Korean Office Action; Application 10-2017-0149692; dated Mar. 12, 2019.

European Search Report; Application EP19176749; dated Sep. 4, 2019.

* cited by examiner

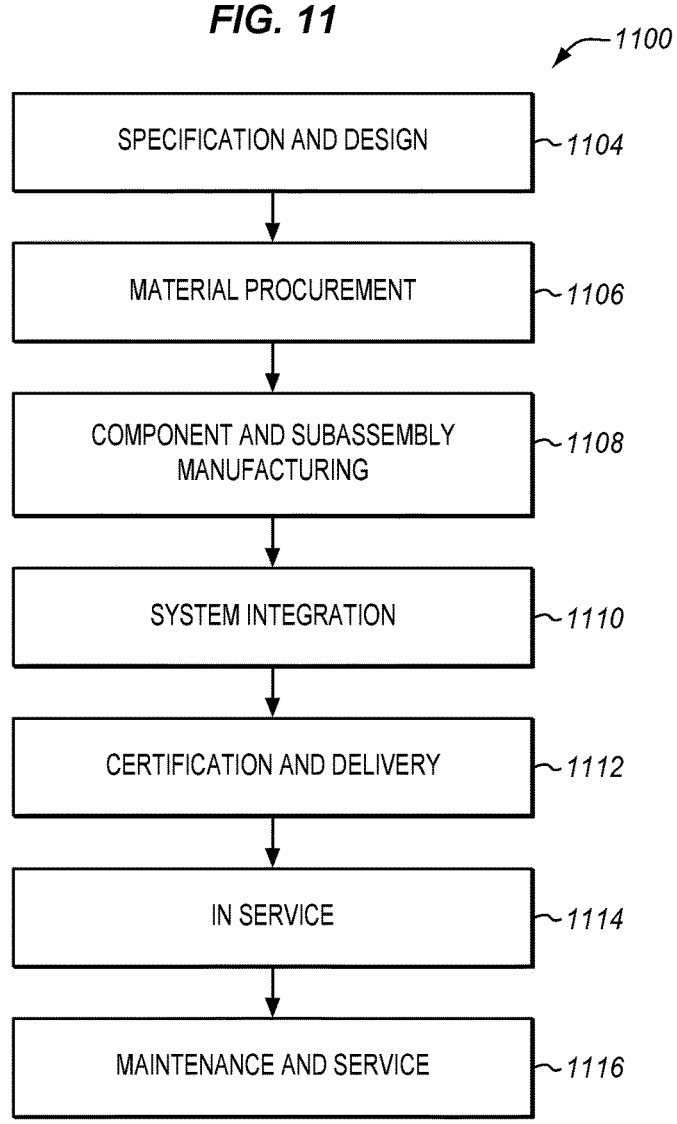
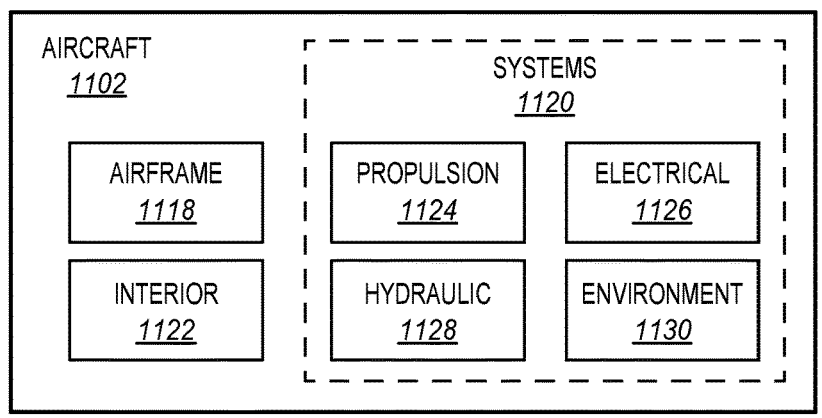

FASTENERS HAVING ENHANCED ELECTRICAL ENERGY DISPERSION PROPERTIES

FIELD

The disclosure relates to the field of fasteners, and in particular, to fasteners that disperse electrical energy.

BACKGROUND

Fasteners are used in the aerospace industry to mechanically unite various structural components of an aircraft. For example, composite or metal panels that form a portion of a skin of an aircraft wing may be joined to one another via a fastener. In aircraft structures, it is often desirable to install fasteners in interference, meaning that the fastener diameter is larger than the diameter of the hole that receives it. Interference-fit installation of fasteners can facilitate aircraft assembly operations and improve joint performance. As fasteners are intended to enhance the structural strength of an aircraft, it remains desirable to ensure that the act of installing a fastener does not damage underlying structural components of the aircraft. In particular, if an interference-fit fastener is forced through a composite part with too much force, it may cause the composite part to delaminate or experience other issues. Thus, an interference fit fastener may utilize a lubricant that reduces the amount of force used to drive the fastener during installation. Excessive force may also result in damage to the fastener and, in joints comprised of metal and composite parts, it can additionally result in detrimental galling, scoring or excessive deformation of the metal parts. The magnitude of the fastener insertion force may be controlled by the application of lubricants to the fastener or to the hole, by limiting the amount of interference, or by using means other than driving or pulling the fastener into the hole to create the desired state of interference.

Although structural strength of a fastener is important to consider, it is also important for fasteners to adequately conduct and/or disperse electrical energy from the surrounding structure. Hence, it remains important for the fastener to efficiently disperse electrical energy to surrounding structural components in a manner that prevents energy from building at the fastener.

While both structural strength and electrical compatibility remain desirable, it is a complicated process to balance both of these requirements when designing a fastener. For example, a fastener may be coated in order to enhance lubricity and therefore reduce the amount of force used to install the fastener. However, coatings, and/or finishes may electrically insulate the fastener from its surroundings, thereby confounding the ability of the fastener to adequately dissipate electrical energy. As another example, using fasteners sheathed in a protective metal sleeve may provide an adequate level of energy dissipation and reduce the possibility of damaging composite parts during fastener installation. However, such fasteners can be generally costly.

For at least these reasons, designers continue to seek out fastener designs that strike a balance in fulfilling both structural and electrical design constraints.

SUMMARY

Embodiments described herein apply irregular (e.g., speckled/spattered) metal pigmentation coatings onto fasteners in regions where the fasteners will be installed into a hole in a state of interference. For example, embodiments described herein may comprise pull-type lock bolts that include a shank dimensioned for an interference fit with structural components of an aircraft. The surface of the fastener may be bare, or may be coated partially or in its entirety with a finish (e.g., anodize, or a finish formed from bare metal via grit blasting etc.). Additionally, a portion of the fastener is coated in an irregular (i.e., unpatterned) high-lubricity coating, such as a metal pigmentation coating or dry film lubricant coating, such that the coating is randomly interspersed with regions of bare (or finished) metal. In this manner, application of the coating enhances lubricity without substantially compromising electrical conductivity of the fastener. This is because remaining exposed regions not covered by the coating (e.g., regions of bare or anodized metal) provide desired levels of electrical energy dispersion at the fastener surface discontinuously along the entire circumference (i.e., all 360°) of the fastener.

One embodiment is an apparatus that includes a fastener. The fastener includes a head, a cylindrical shank that extends from the head and is dimensioned to engage in a fit with a corresponding hole, and a coating that is discontinuously speckled around a circumference of the shank and extends axially along the shank, leaving irregular portions of a surface of the shank exposed. The coating exhibits a higher lubricity than the surface, and the coating exhibits a higher dielectric withstand voltage than the surface.

A further embodiment is a method. The method includes acquiring a fastener comprising a head and a cylindrical shank that extends from the head, and applying a speckled coating around a circumference of the shank and extending axially along the shank, leaving irregular portions of a surface of the shank exposed and uncovered by the coating.

A further embodiment is a method. The method includes forming a fit between a fastener and a hole by driving a shank of the fastener into the hole, facilitated by coating that has a higher lubricity than a surface of the shank and is discontinuously speckled over a circumference of the shank. The method also includes building up electrical energy between the shank and the hole, traversing the electrical energy around the coating, and dissipating the electrical energy at irregular portions of the shank that are not covered by the coating, along the entire circumference of the shank.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 11 is a flow diagram of aircraft production and service methodology in an exemplary embodiment.

FIG. 12 is a block diagram of an aircraft in an exemplary embodiment.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
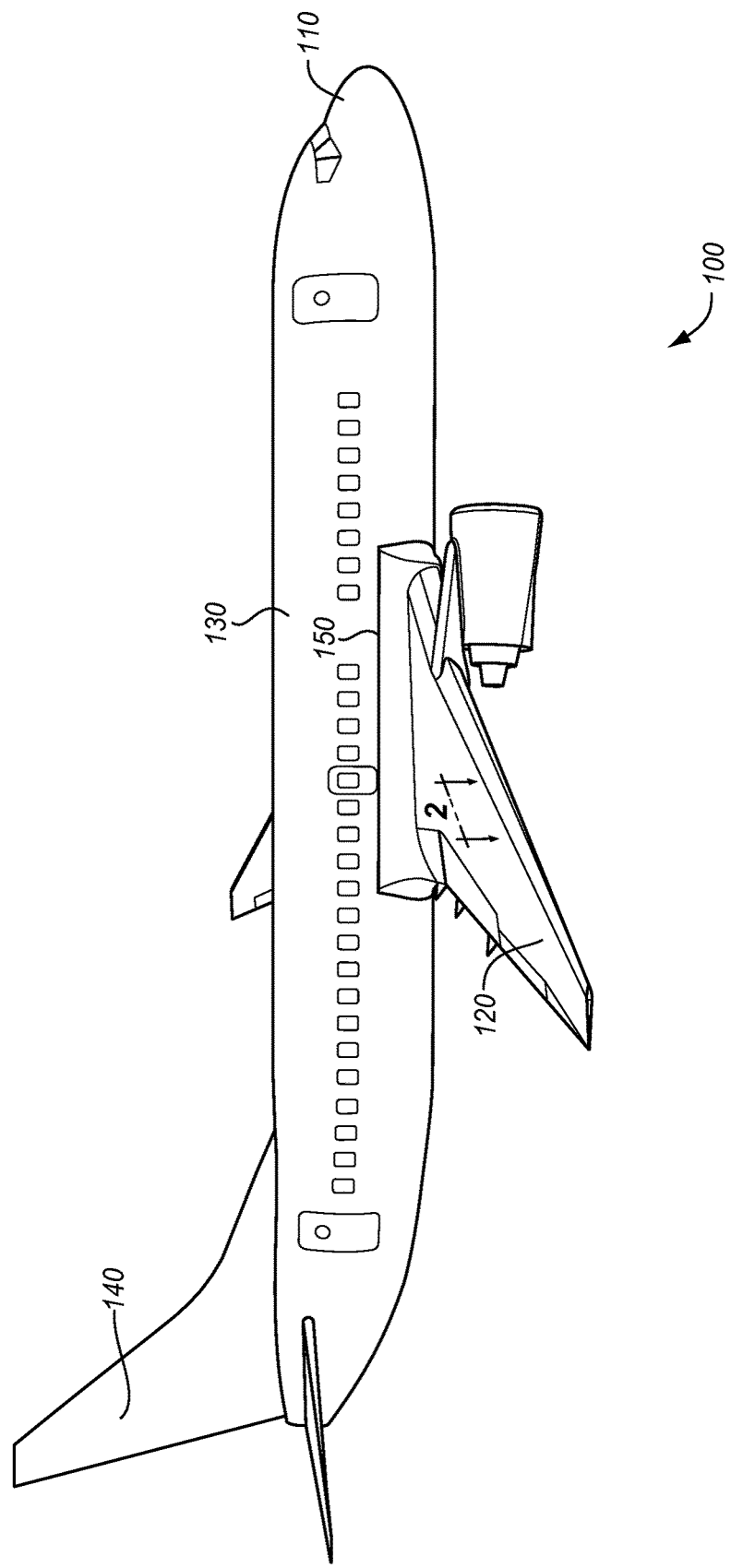
FIG. 1 is a diagram of an aircraft an exemplary embodiment.

FIG. 1 illustrates the structure of an exemplary aircraft that may utilize enhanced fasteners. Specifically, FIG. 1 is a diagram of an aircraft 100 in an exemplary embodiment. Aircraft 100 includes nose 110, wings 120, fuselage 130, and tail 140.

Figure 2:
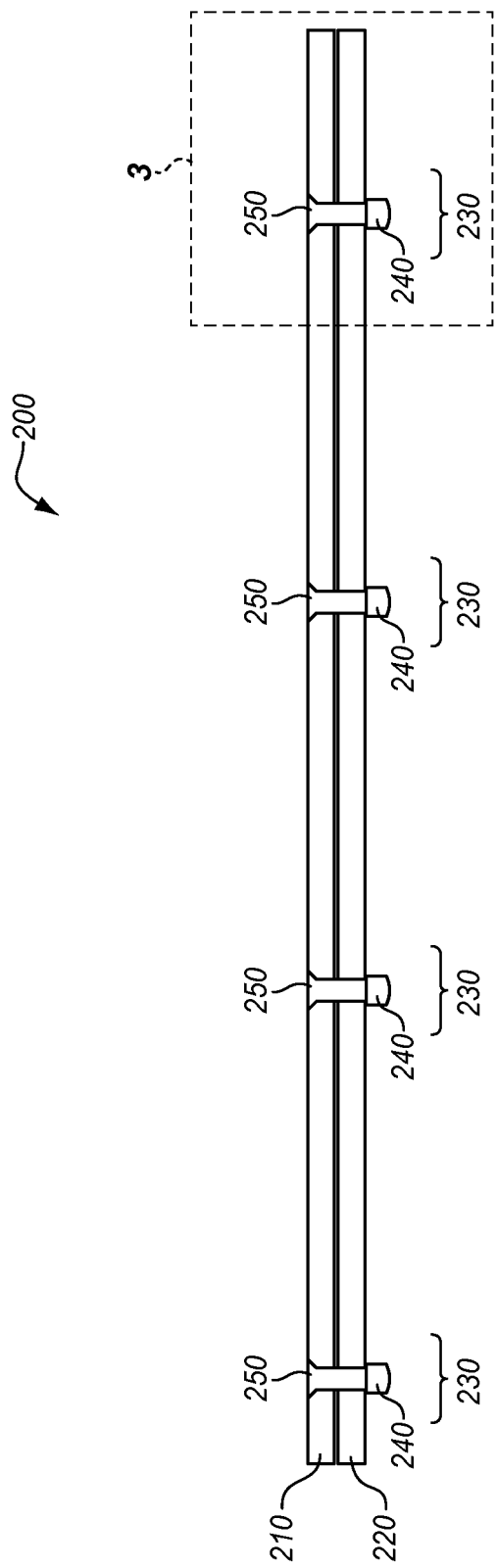
FIG. 2 is a cut-through view of a section of skin of a wing in an exemplary embodiment.

FIG. 2 is a cut-through view of a section of wing skin 200 of aircraft 100 indicated by view arrows 2 in FIG. 1. As shown in FIG. 2, wing skin 200 comprises multiple composite or metal parts (210, 220), which include holes 230. Fasteners 250 are driven through holes 230 (e.g., to form an interference fit), and are secured with securements 240 (e.g., swaged-on collars or threaded nuts). Securements 240 may be swaged onto fasteners 250 at locations where pintails have been broken off of fasteners 250. Fasteners 250 may comprise pull-type lock bolts, stump-type lock bolts, HI-LOK brand pins, or any other type of permanent pin-type fastener.

Figure 3:
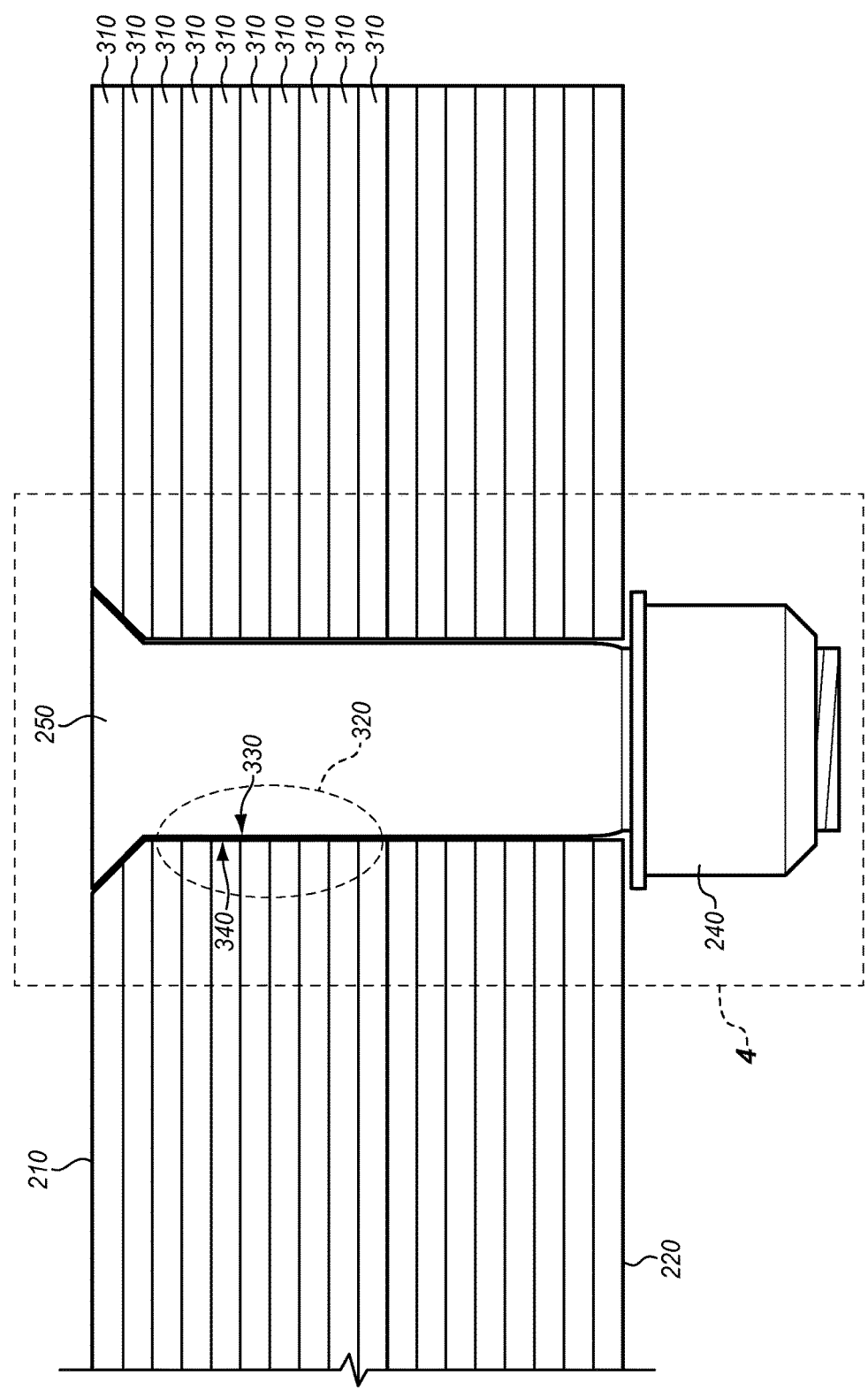
FIG. 3 is a zoomed-in view of a fastener in an exemplary embodiment.

FIG. 3 is a zoomed-in view of a fastener 250 that attaches parts (210, 220) forming a section of skin 200 in an exemplary embodiment. FIG. 3 corresponds with region 3 of FIG. 2. FIG. 3 illustrates that, in this embodiment, each part may comprise a composite part including one or more layers/plies 310 (e.g., carbon fiber within a cured matrix of resin). In further embodiments, parts 210 and 220 are metal. FIG. 3 further illustrates that within region 320, fastener 250 is placed into an interference fit with part 210. Although an interference fit is achieved, small air gaps (not shown) may still remain at certain locations between fastener 250 and part 210. These air gaps are caused by surface irregularities that may occur when drilling holes in composite materials. These small air gaps in turn insulate small portions of fastener 250 from composite part 210. Fastener 250 may further include a coating that provides corrosion protection and enhanced lubricity. The coating may facilitate the installation of fastener 250, but may also electrically insulate fastener 250 from composite parts 210 and 220. Ideally, the level of insulation is low enough so as to ensure a low dielectric withstand voltage, thereby ensuring that no substantial electrical arcing occurs between wall 330 of fastener 250, and wall 340 of composite part 210 in the event of an electrical discharge through region 320. While FIG. 3 illustrates fastener 250 being used for a composite-composite joint, fastener 250 may also be used for a metal-composite joint, or any suitable location.

Figure 4A:
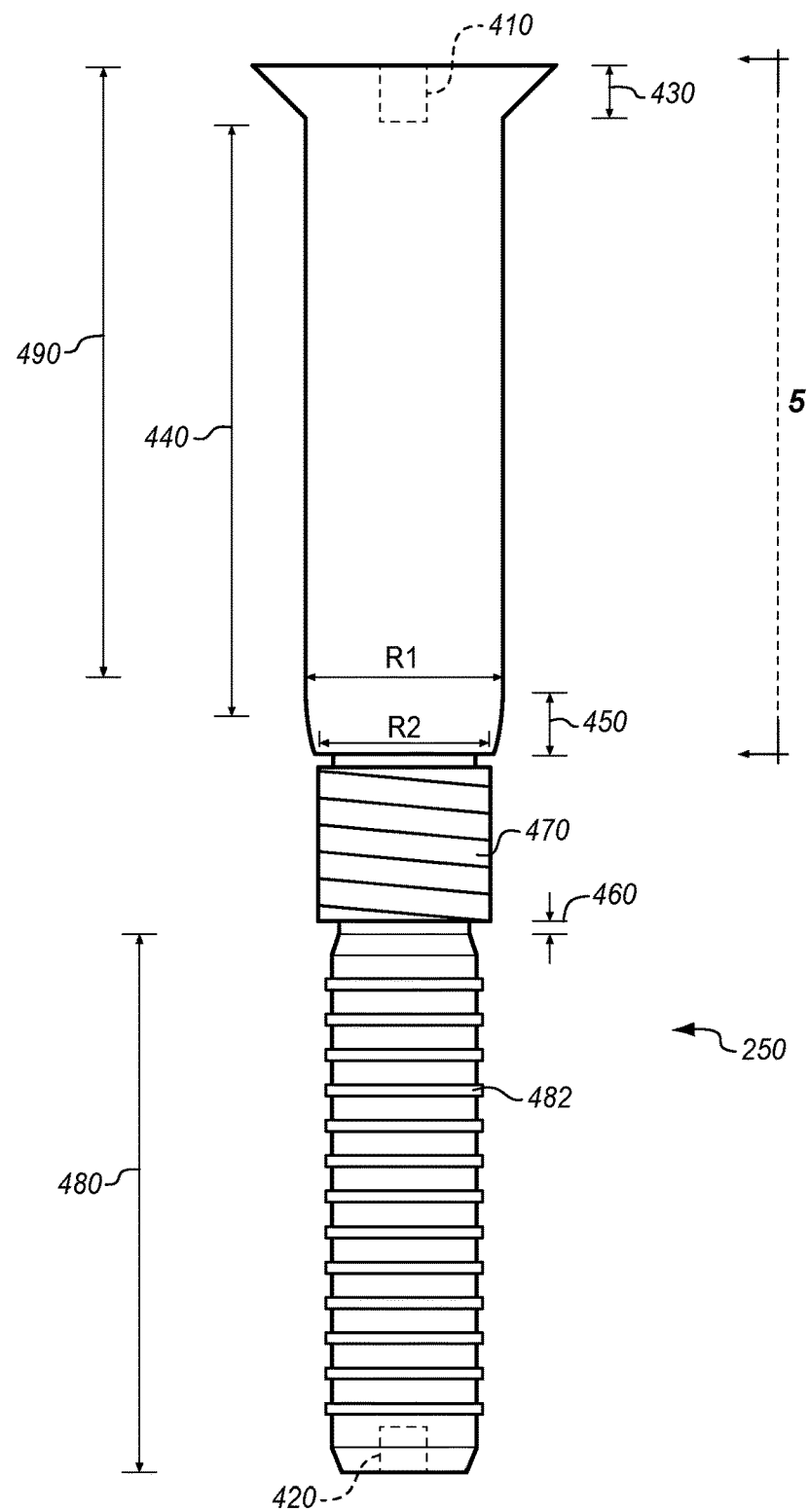
FIG. 4A-4B are additional views of fasteners in an exemplary embodiment.
Figure 4B:
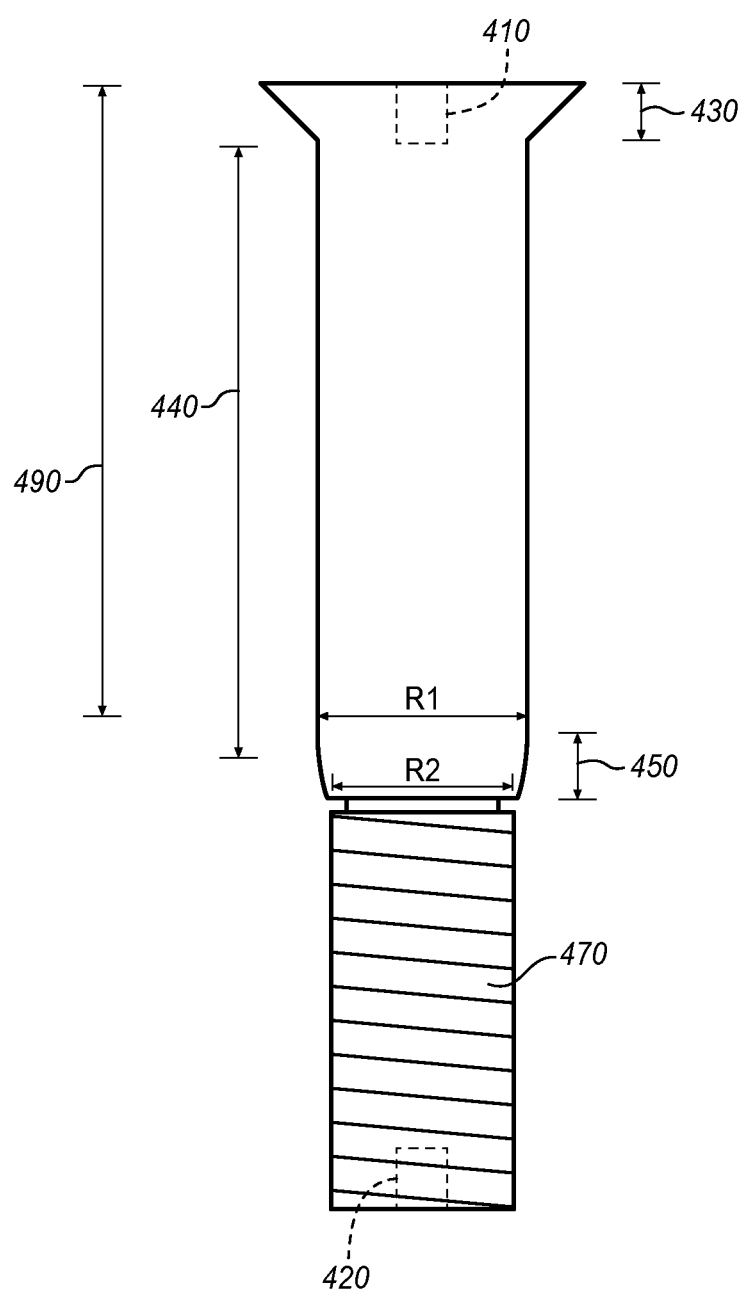

FIG. 4A is an additional view of fastener 250 in an exemplary embodiment, and corresponds with region 4 of FIG. 3. FIG. 4A illustrates a lock bolt configuration that is designed for installation with a swaged metallic collar (not shown). Fastener 250 further includes head 430, shank 440, lead-in transition 450, break groove 460, feature 470, and pintail 480 (including feature 482. In one embodiment, feature 470 and/or feature 482 are annular shapes (e.g., rings), such that fastener 250 is forced into place by directly pushing fastener 250 into hole 230. In a further embodiment, features 470 and/or 482 are threading. FIG. 4B illustrates a fastener 250 implemented as a threaded fastener, including slots 410 and 420 (e.g., hexagonal female slots, prismatic "star drive"/TORX slots, or other suitable slots that facilitate installation of fastener 250 into hole 230). In this embodiment, feature 470 comprises threads designed to accommodate a threaded collar or nut (not shown). FIGS. 4A-4B further illustrate coating coverage area 490, where a high-lubricity coating (e.g., a metal pigment coating or dry film lubricant) is applied in a non-uniform discontinuous manner to fastener 250. Areas of fastener 250 other than the head 430 and shank 440 may be fully coated with high-lubricity coatings in order to facilitate fastener installation.

Figure 5:
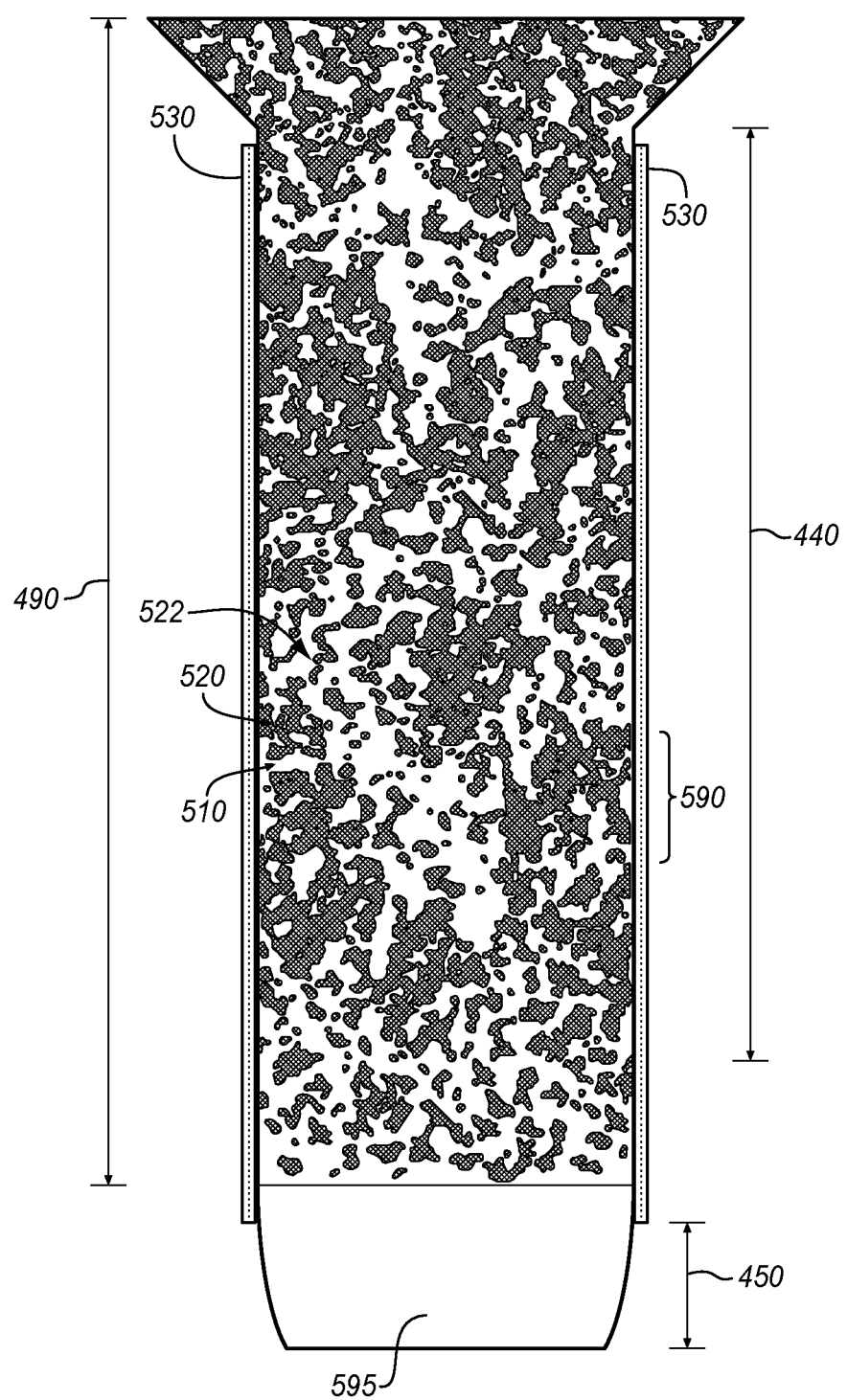
FIG. 5 is a zoomed in view of a discontinuous coating applied to a fastener in an exemplary embodiment.

FIG. 5 is a close-up view of coating coverage area 490 of fastener 250 of FIGS. 4A and 4B. Specifically, FIG. 5 illustrates that coating 510 (e.g., an Al or Cu metal pigment coating, a coating of dry-film lubricant such as molybdenum disulfide, etc.) may be discontinuously applied within area 490. The coating coverage area 490 may encompass the bearing portion of the fastener, including fastener head 430 and shank 440, stopping at fastener lead-in transition 450. The surface of coating coverage area 490 may comprise bare metal (e.g., titanium or a ferrous or nickel-base alloy having enhanced properties of electrical conduction) or a finish (e.g., anodize). FIG. 5 illustrates regions 522 of the coating coverage area 490 where some of the original surface/finish 520 of fastener 250 remains visible after application of the high-lubricity coating. Areas of fastener head 430 that are not in contact with hole 230 after installation need not receive coating 510.

Coating 510 beneficially increases the lubricity (and/or corrosion resistance) of fastener 250 when compared with commonly used fastener finishes or bare metal. As coating 510 is applied on the surface 520 of shank 440, a majority of sliding friction force endured by fastener 250 during installation is borne by coating 510. Fortunately, the portions of shank 440 covered by coating 510 are among the regions of the fastener 250 needing the highest amount of lubricity during fastener insertion into hole 230 for an installed state of interference. Hence, shank 440 may slide into hole 230 along its most lubricious portions, reducing the amount of force involved in installing fastener 250.

While coating 510 provides the above-noted benefits relating to fastener installation, coating 510 may not provide sufficient conductivity to ensure that fastener 250 properly dissipates electrical energy. For example, a coating 510 formed from metal pigment coating may have a dielectric withstand voltage in the range of zero to two thousand volts, as compared with anodized metal having a dielectric withstand voltage in the range of zero to sixty volts, or some other intrinsically low voltage. This means that a uniform metal pigment coating on shank 440 would cause shank 440 to experience high voltage discharges of electrical energy (e.g., discharges of about two thousand volts), which is undesirable. Hence, although coating 510 is desirable to ensure compatibility with structural design constraints, coating 510 exacerbates issues pertaining to electrical constraints because it exhibits less than a desired level of electrical energy conduction.

To address this issue, instead of uniformly coating the entirety of fastener 250 (or shank 440 and head 430) with coating 510, or applying solid regions (e.g., stripes) of coating 510 to fastener 250, shank 440 and/or head 430 are discontinuously coated in an irregular, non-uniform and/or unpatterned mosaic 590 application of coating 510. This technique is beneficial in that it eliminates any need to mask fastener 250 (e.g., in order to apply solid stripes of coating 510), which removes a step involved in the fabrication of fasteners 250 and therefore reduces cost. Furthermore, this technique balances concerns related to electrical and structural design constraints.

An additional benefit exists in the use of a non-uniform coating. Specifically, coating 510 may be applied via spraying to form a speckled/spattered film on head 430 and/or shank 440. As used herein, a speckled/spattered arrangement comprises a random distribution of coating across the entire perimeter of head 430 and/or shank 440. By adjusting a pressure, time of exposure, and/or orifice size for the sprayer, a percentage of surface area in area 490 covered by coating 510 may be carefully adjusted. This enables the electrical and physical properties of fastener 250 to be adjusted as desired. For example, the percentage of surface area of shank 440 (and/or head 430) covered by coating 510 may be varied as a matter of design choice to between thirty and seventy percent. The percentage may even vary along the axial length of fastener 250. The percentage area of coating 510 may be increased for fasteners that would otherwise require high amounts of force to install (e.g., fasteners having long grip lengths/axial lengths for shanks 440, or fasteners having shanks with larger diameters). In contrast, the percentage area of coating 510 may be decreased for fasteners that are exposed to higher electrical currents and where fastener 250 insertion force requirements may be less demanding.

The percentage area of coating 510 on shank 440 may also vary depending on whether or not surface 520 features a finish (e.g., anodize) or is bare metal. If surface 520 is bare metal, more coating 510 may be allowed while still conforming with electrical constraints, but more coating 510 may also be needed to ensure that the amount of force used to overcome friction with laminate plies does not exceed a predefined amount. As noted above, if fastener 250 is driven with too much force, it may damage underlying structural components (e.g., by delaminating those components in the region around hole 230 and causing ply separation). In a similar fashion, if surface 520 is anodized, less coating 510 may be allowed to conform with structural constraints, but less coating 510 may also be needed to ensure sufficient dispersion of electrical energy.

In addition to coating 510, an optional lubricant 530 is shown. Lubricant 530 is applied to fastener 250 (e.g., via a dip or spray). Lubricant 530 is applied after coating 510 is speckled on. Furthermore, lubricant 530 may be applied to shank 440 or the entirety of fastener 250. However, lubricant 530 differs substantially from coating 510 in that lubricant 530 is not fused, baked, or otherwise firmly adhered onto/integral with fastener 250. Instead, lubricant 530 comprises a traditional lubricant (e.g., an oil, cetyl alcohol, wax, sealant etc.) which acts as a sacrificial lubricant during installation. That is, the majority of lubricant 530 is rubbed away/off or otherwise dissipated during installation, and hence the insulating properties of lubricant 530 do not substantially impact the electrical properties of fastener 250. Since the installation of fastener 250 involves an interference fit, lubricant 530 alone (e.g., without coating 510) is insufficient to ensure that the driving force applied to fastener 250 will be below a desired threshold level of friction. Specifically, the interference contact involved in an interference fit ensures that lubricant 530 will be scraped off during installation, meaning that coating 510 defines in large degree the amount of installation force used for fastener 250. Hence, lubricant 530 may be considered an optional complement to coating 510, but does not replace the role of coating 510. FIG. 5 further illustrates an additional and/or alternative coating/finish that may be applied to lead-in portion/transition 450. Coating 510 may further continue into region 595, including lead-in transition 450. In a further embodiment, a different high-lubricity coating may be utilized in region 595 than coating 510. The coverage of region 595 by coating 510 may be complete (e.g., as shown) in order to fully cover the circumference of lead-in transition 450. In another embodiment, the coverage may be speckled in a similar manner as described above for shank 440.

Figure 6:
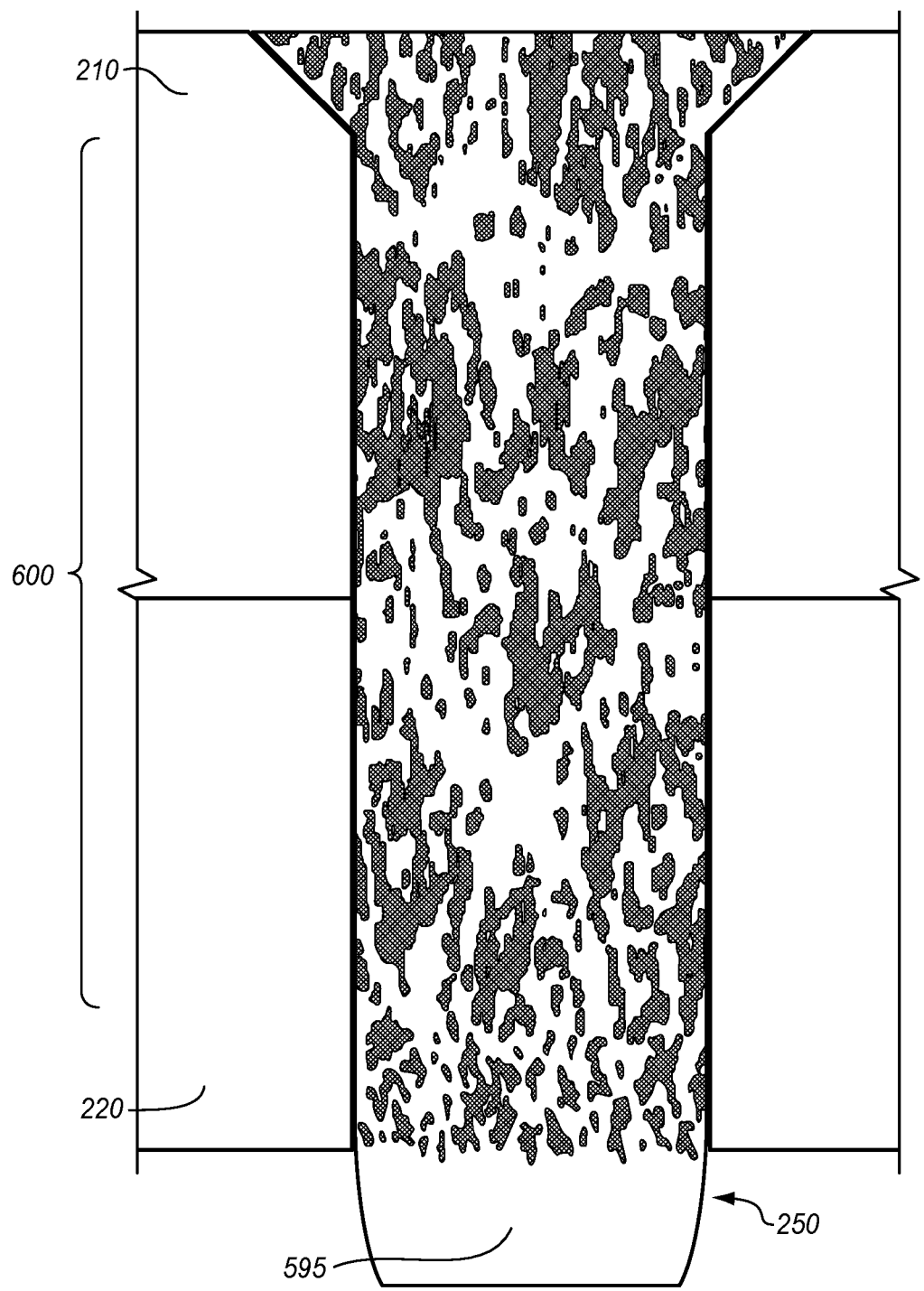
FIG. 6 is a zoomed in view of a smeared discontinuous coating at an installed fastener in an exemplary embodiment.

FIG. 6 illustrates a further view of fastener 250 after fastener 250 has been installed at skin 200 of aircraft 100. As shown in FIG. 6, the force of installing fastener 250 (by forcing fastener 250 in direction D into a hole of a smaller diameter has caused portions of coating 510 to shear, resulting in coating 510 having a smeared appearance 600. This alters the arrangement of coating 510 on fastener 250, but does not substantially change the amount of surface area occupied by coating 510. For the purposes of discussion, notes regarding a desired percentage of surface area occupied by coating 510 are directed towards the amount of surface area occupied by coating 510 prior to installation.

Illustrative details of the fabrication and operation of fastener 250 will be discussed with regard to FIGS. 7-8. Assume, for this embodiment, that fastener 250 has not yet been fabricated.

Figure 7:
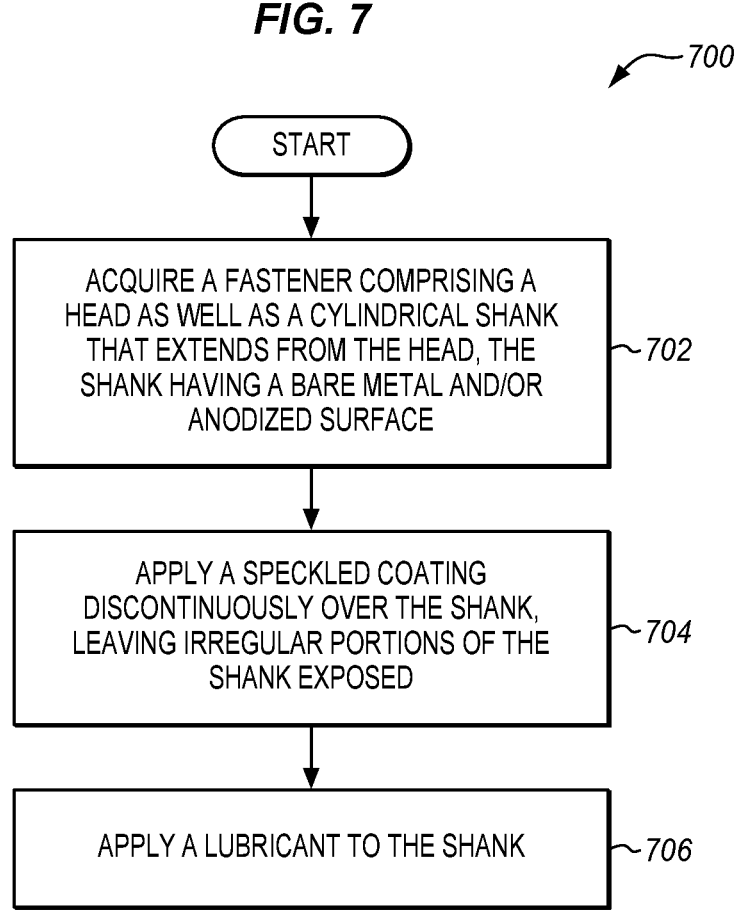
FIG. 7 is a flowchart illustrating a method for fabricating a fastener in an exemplary embodiment.
Figure 8:
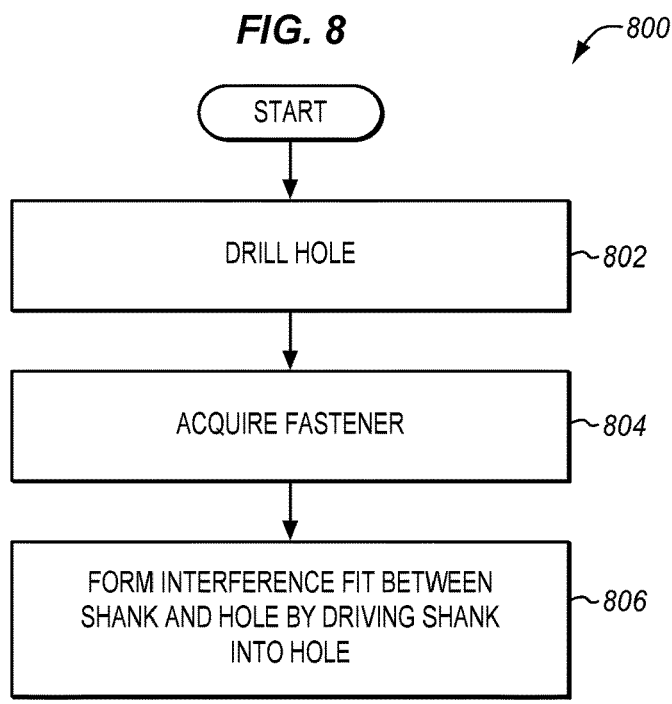
FIG. 8 is a flowchart illustrating a method for installing a fastener in an exemplary embodiment.

FIG. 7 is a flowchart illustrating a method 700 for fabricating a fastener 250 in an exemplary embodiment. The steps of method 700 are described with reference to fastener 250 of FIG. 1, but those skilled in the art will appreciate that method 700 may be performed for other fasteners (e.g., bolts, screws, rivets, etc.) in order to achieve a desired result. The steps of the flowcharts described herein are not all inclusive and may include other steps not shown. The steps described herein may also be performed in an alternative order.

According to method 700, fastener 250 is acquired, including head 430 and cylindrical shank 440 (step 702). Shank 440 includes surface 520, which may be bare metal or anodized metal. In one embodiment, fastener 250 may be forged from a titanium, ferrous alloy, or nickel alloy form, or may be machined from a precursor part. Alternatively, fastener 250 may be acquired from a supplier that manufactures fasteners in volume. The fastener 250 may furthermore comprise a finish over part of, or the entirety of its surface.

A high lubricity coating 510 is speckled over shank 440 (step 704). Coating 510 may further be applied to head 430 in a similar manner. Coating 510 is discontinuously applied (e.g. speckled) over irregular (e.g., randomly shaped) portions of head 430 and/or shank 440, and leaving irregular portions of shank 440 exposed. This forms an unpatterned mosaic of spattered/speckled coverage arrangement across the surface of shank 440 (e.g., across the entire circumference of shank 440 and/or the entire circumference of head 430, and extending axially), ensuring that a desired percentage of the surface area of shank 440 is covered by coating 510. As discussed above, coating 510 enhances the lubricity of shank 440, reducing the amount of effort used in installing shank 440 in an interference fit into hole 230. This in turn helps in overcoming interference fit friction. However, if coating 510 were applied across the entirety of shank 440 in a manner that completely covered the entire surface of shank 440, coating 510 would be electrically insulated from parts 210 and 220, resulting in diminished capability of fastener 250 to disperse electrical energy.

Applying coating 510 in a non-uniform, irregular manner (e.g., an unpatterned manner) provides a further and seemingly paradoxical benefit in that coating 510 remains, on average, evenly distributed along the entire circumference of shank 440, even though the specific regions occupied by coating 510 are random. In this manner, no portion of the circumference of shank 440 (e.g., 30°, 60°, 90°, 120°, etc.) has a substantially different ratio of coating 510 to exposed surface 520 (e.g., the ratio of these components remains substantially the same/constant as the circumference is traversed, such as within ten percent of a desired value). Thus, unlike a "striped" pattern of application for coating 510 along the circumference of fastener 250, which would necessarily cause uncoated regions to experience greater local amounts of friction (and therefore higher risk of damage) during insertion, fastener 250 includes a more uniform lubricity (on an area-by-area basis). Fastener 250 therefore achieves better lubricity than striped fasteners, and the cost of manufacture is less than that for striped fasteners, which require masking. Furthermore, unlike a striped system, electrical current does not have to flow past large solid coated areas/stripes at fastener 250 in order to reach a region where dissipation of electrical energy may occur. Hence, fastener 250 exhibits more uniform/better electrical energy dissipation capability (e.g., dielectric withstand voltages) along its circumference (on average) than striped fasteners. Coating 510 marginally increases the width/diameter of fastener 250. For example, coating 510 may increase the width of fastener 250 by several thousandths of an inch (i.e., less than one hundredth of an inch). This means that the diameter of the coated fastener is not consistent as the coating is not consistent. However, the added thickness has no substantial impact on installation.

Coating 510 may consist of a high-lubricity metal-pigmented organic material or a dry-film lubricant. Coating 510 may be thermally processed (e.g., cured) after application to ensure that coating 510 is heat-fused to shank 440 and is not rubbed off or otherwise perturbed (except for example when shank 440 is fit into hole 230). In one embodiment, speckling comprises physically spattering coating 510 over shank 440. This means that no masking is needed.

With coating 510 successfully applied, lubricant 530 (e.g., cetyl alcohol) is applied to fastener 250 (step 706). For example, fastener 250 may be dipped and/or uniformly sprayed with lubricant 530 (i.e., saturated, resulting in no irregularities in coverage) in order to cover fastener 250. In embodiments where lubricant 530 is cetyl alcohol, lubricant 530 may be sacrificial in nature, rubbing off during the installation of fastener 250, and thereby ensuring minimal interference with (e.g., insulation of) the conductivity of shank 440.

Method 700 may be performed via batch processes of forming, machining, spraying, and/or dipping in order to ensure sufficient throughput of fasteners 250 for aircraft manufacturing. Since no masking is required (e.g., since fastener 250 is not masked and then sprayed with solid stripes of continuous coating 510), the amount of labor and time involved in the manufacture of fasteners 250 is reduced.

With fasteners 250 successfully fabricated, an aircraft manufacturer may desire to install fasteners 250 on an aircraft (e.g., aircraft 100). To this end, FIG. 8 is a flowchart illustrating a method 800 for installing a fastener 250 using a semi-automated or manual assembly process in an exemplary embodiment. According to method 800, a hole of a predetermined diameter is drilled into an aircraft (e.g., by an automated machine in accordance with a Numerical Control (NC) program, by a technician, etc.) (step 802). A fastener 250 is acquired by the machine having an appropriate diameter and grip length (step 804). The diameter may be chosen such that it is larger (e.g., by several thousandths of an inch) than the hole. This may be performed, for example, by loading a fastener (or batch of fasteners) into a fastener insertion machine (not shown). The fastener insertion machine may consist of a machine end effector that may operate according to a Numerical Control (NC) program implemented by a controller/processor in order to select a hole 230 into which to install fastener 250. In one embodiment, hole 230 is located at a fuel tank of an aircraft. The diameter of the hole 230 is sized such that when fastener 250 is installed, a prescribed level of interference is attained within tolerance. With a hole 230 chosen, the fastener insertion machine forms an interference fit between shank 440 and hole 230, by driving/inserting shank 440 into hole 230 (step 806). This operation may be performed by torqueing shank 440 into hole 230 via feature 470 (e.g., threading), or by directly forcing shank 440 into place. In a further embodiment, shank 440 may be held in hole 230 after insertion to prevent rotation. This may be performed for example during installation of a securement 240 (e.g., a nut) onto fastener 250. After a number of fasteners 250 have been installed in this manner, an operator then follows by installing collars or nuts using hand-held or automated tools as desired. In all cases, since shank 440 is partially covered with coating 510, the lubricity of shank 440 is enhanced, reducing the amount of installation force used. With shank 440 in place in an interference fit, fastener 250 performs its role of fastening desired structural components (e.g., composite or metal parts that each form a portion of skin 200). Steps 802-806 may be repeated multiple times (e.g., hundreds or thousands of times) during the manufacturing of aircraft 100, in order to fasten the various components of aircraft 100. Upon aircraft 100 being fully manufactured, it may then be operated in flight.

Methods 700-800 utilize fasteners that exhibit an advantage over prior coated fastener systems in that fasteners 250 ensures that structural requirements of lubricity are met, while also ensuring that fasteners 250 safely dissipate electrical energy. Compared to fasteners sheathed in metallic sleeves, another system sometimes used in similar applications, methods 700-800 provide a one piece fastener at much lower cost.

With fasteners 250 installed, operation of the aircraft 100 (e.g., during flight) may cause electrical energy to build at fastener 250. This energy may be the result of a lightning strike. This built-up charge continues to accumulate until it overcomes the dielectric withstand voltage of surface 520, at which point electrical energy between hole 230 and fastener 250 is dissipated at locations on surface 520 When energy is dissipated at fastener 250, dissipation occurs between exposed portions of surface 520 and hole 230, and not between coating 510 and hole 230. In one embodiment, coating 510 possesses a higher dielectric withstand voltage than surface 520. Charge may therefore dissipate via surface 520 before the dielectric withstand voltage of coating 510 is met. This operation is beneficial, as dissipating charge through the relatively large area of surface 520 prevents the generation electrical arcs, for example limiting dissipation voltages to between about zero and sixty volts (preferably between zero and twenty volts).

Figure 9:
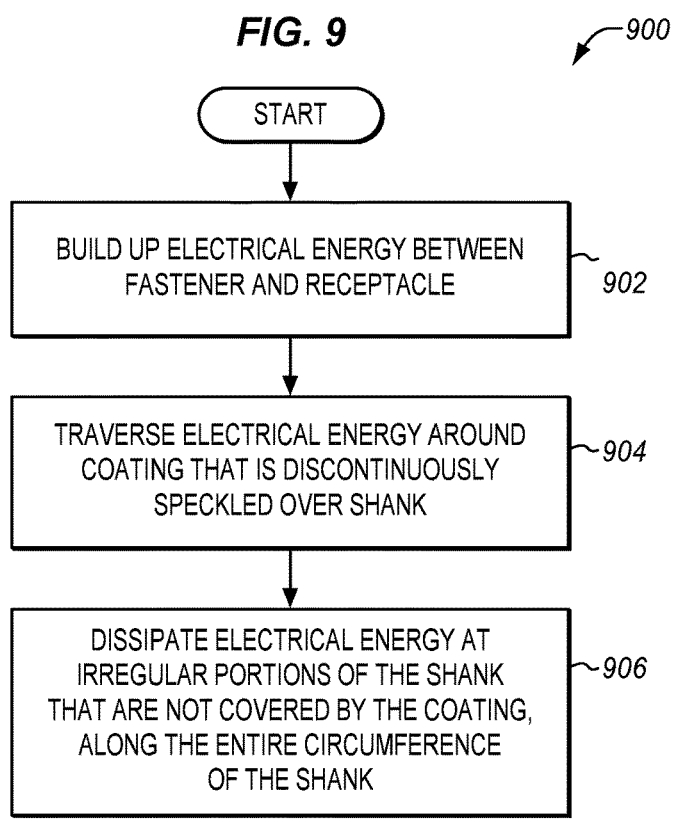
FIG. 9 is a flowchart illustrating a method for exchanging electrical energy between a fastener and hole in an exemplary embodiment.

FIG. 9 is a flowchart illustrating a method 900 for dissipating electrical energy between a fastener 250 and a hole 230 in an exemplary embodiment. Assume, for this embodiment, that fastener 250 has been installed in hole 230. Electrical energy builds up between fastener 250 and hole 230 (step 902). This may occur for example during flight. Next, the built-up electrical energy traverses around coating 510, which covers surface 520 of fastener 250 (step 904). Since coating 510 exhibits a higher dielectric withstand voltage than surface 520, electrical energy passes around coating 510 instead of passing into fastener 250 via coating 510. Next, electrical energy is dissipated between surface 520 of shank 440 and hole 230 (step 906). This action is performed discontinuously along the entire circumference (i.e., the entire) 360° of shank 440 at irregular portions, any may occur at each location that is not coated by coating 510.

In a further embodiment, a sprayer may be calibrated to adjust the size of individual spots/speckles applied to fastener 250. For example, in order to ensure that a randomly applied speckles do not substantially vary in terms of the percentage of surface area occupied in a given portion of fastener 250, it may be desirable to select spot sizes that are between approximately one tenth and one thousandth the circumference of fastener 250.

EXAMPLES

In the following examples, additional processes, systems, and methods are described in the context of a semi-automated titanium pull-type lock bolt fastener installation on the structure of an aircraft.

Figure 10:
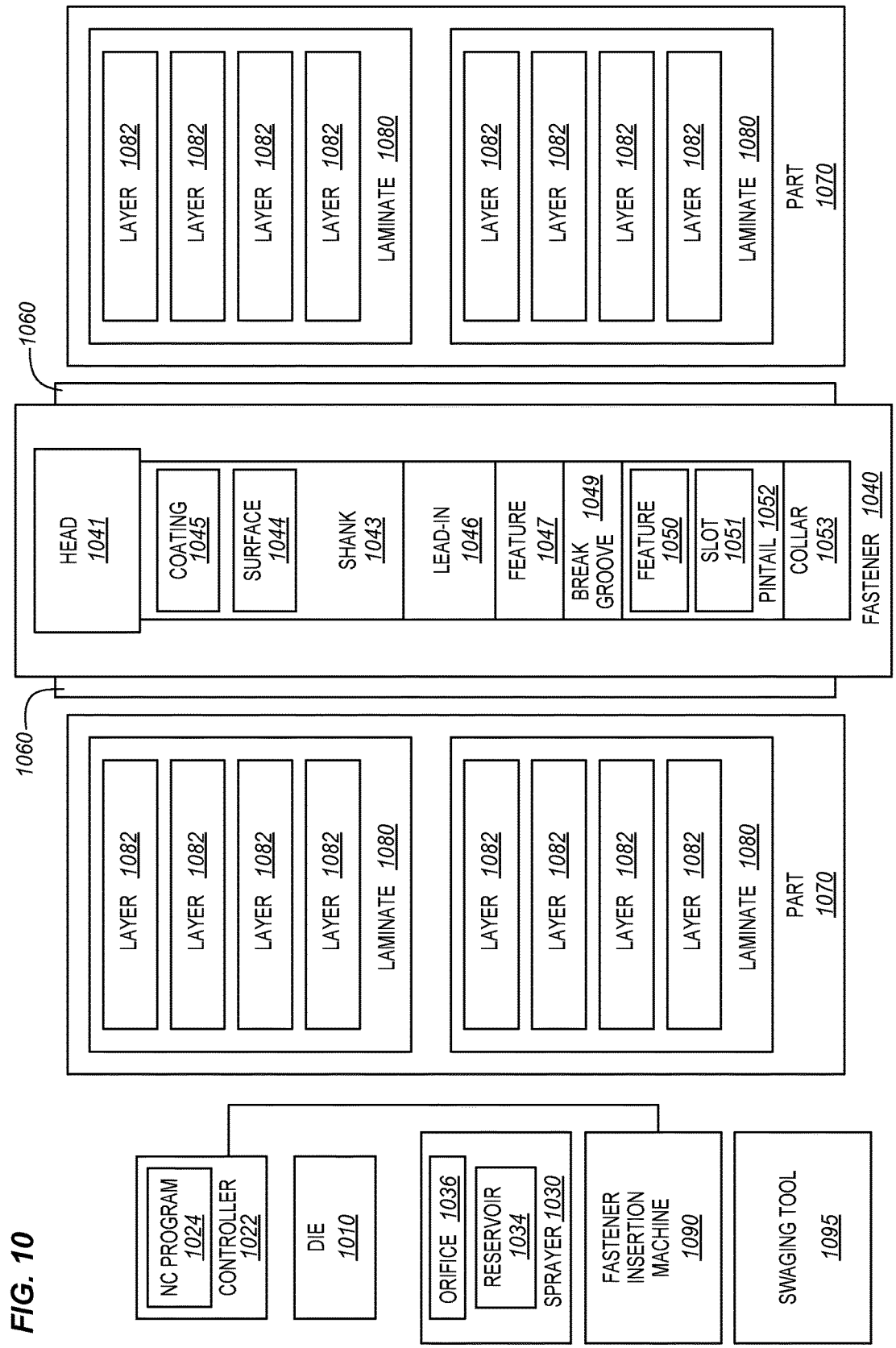
FIG. 10 is a block diagram of a fastener in an exemplary embodiment.

FIG. 10 is a block diagram of a fastener 1040 and accompanying machinery in an exemplary embodiment. Specifically, FIG. 10 illustrates a titanium pull-type lock bolt fastener 1040 which includes head 1041. Fastener 1040 further includes shank 1043, which itself includes surface 1044 (e.g., an anodized or bare metal surface) and high-lubricity coating 1045. Coating 1045 is applied discontinuously, irregularly, and or in a non-uniform fashion (e.g., randomly) upon head 1041 and shank 1043, leaving irregular portions of surface 1044 exposed while other portions of surface 1044 are covered. Coating 1045 application is accomplished during fastener 1040 fabrication using automated spray equipment. Fastener 1040 further includes lead-in transition 1046, which gradually reduces in diameter as it extends from shank 1043 into features 1047 (e.g., threading). Break groove 1049 is also illustrated. Feature 1047 and pintail 1052 are separated by neck/break groove 1049. Pintail 1052 includes feature 1050 (e.g., annular rings) that allow a swaging tool to engage the fastener 1040 and keep the joint clamped during collar 1053 installation and swaging. Pintail 1052 will be broken off after installation of fastener 1040, and pintail 1052 includes feature 1050 as well as slot 1051. Fastener 1040 is covered in lubricant 1060. During installation, collar 1053 will be swaged onto feature 1047, locking fastener 1040 in place.

Further components illustrated in FIG. 10 include parts 1070 comprising laminates 1080 which each comprise individual plies 1082. In some areas, one or more of the structural parts 1070 being joined may be metallic. Assembly equipment may include numerically-controlled drilling and fastener insertion machines 1090 and hand-held fastener insertion tools and swaging tools 1095. Die 1010 (from which fastener 1040 is formed), sprayer 1030 (which applies coating 1045 to shank 1043 by spraying metal pigment coating (e.g., an aluminum-pigmented coating) from reservoir 1034 via orifice 1036), and fastener insertion machine 1090 (which installs fastener 1040) are also illustrated. The operations of fastener insertion machine 1090 and/or sprayer 1030 may be directed by controller 1022 in accordance with a stored NC program 1024.

Referring more particularly to the drawings, embodiments of the disclosure may be described in the context of an aircraft manufacturing and service method 1100 as shown in FIG. 11 and an aircraft 1102 as shown in FIG. 12. During pre-production, exemplary method 1100 may include specification and design 1104 of the aircraft 1102 and material procurement 1106. During production, component and subassembly manufacturing 1108 and system integration 1110 of the aircraft 1102 takes place. Thereafter, the aircraft 1102 may go through certification and delivery 1112 in order to be placed in service 1114. While in service by a customer, the aircraft 1102 is scheduled for routine maintenance and service 1116 (which may also include modification, reconfiguration, refurbishment, and so on). Apparatus and methods embodied herein may be employed during any one or more suitable stages of the production and service method 1100 (e.g., specification and design 1104, material procurement 1106, component and subassembly manufacturing 1108, system integration 1110, certification and delivery 1112, service 1114, maintenance and service 1116) and/or any suitable component of aircraft 1102 (e.g., airframe 1118, systems 1120, interior 1122, propulsion 1124, electrical 1126, hydraulic 1128, environmental 1130).

Each of the processes of method 1100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 12, the aircraft 1102 produced by exemplary method 1100 may include an airframe 1118 with a plurality of systems 1120 and an interior 1122. Examples of high-level systems 1120 include one or more of a propulsion system 1124, an electrical system 1126, a hydraulic system 1128, and an environmental system 1130. Any number of other systems may be included. Although an aerospace example is shown, the principles of the invention may be applied to other industries, such as the automotive industry.

As already mentioned above, apparatus and methods embodied herein may be employed during any one or more of the stages of the production and service method 1100. For example, components or subassemblies corresponding to production stage 1108 may be fabricated or manufactured in a manner similar to components or subassemblies produced while the aircraft 1102 is in service. Also, one or more apparatus embodiments, method embodiments, or a combination thereof may be utilized during the production stages 1108 and 1110, for example, by substantially expediting assembly of or reducing the cost of an aircraft 1102. Similarly, one or more of apparatus embodiments, method embodiments, or a combination thereof may be utilized while the aircraft 1102 is in service, for example and without limitation, to maintenance and service 1116. For example, the techniques and systems described herein may be used for steps 1106, 1108, 1110, 1114, and/or 1116, and/or may be used for airframe 1118 and/or interior 1122. These techniques and systems may even be utilized for systems 1120, including for example propulsion 1124, electrical 1126, hydraulic 1128, and/or environmental 1130.

In one embodiment, fastener 250 secures portions of airframe 1118, and is manufactured during component and subassembly manufacturing 1108. Fastener 250 may then be secured in order to fasten components of airframe 1118 during system integration 1110, and then be utilized in service 1114 until wear renders fastener 250 unusable. Then, in maintenance and service 1116, fastener 250 may be discarded and replaced with a newly manufactured part.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

The invention claimed is:

1. An apparatus comprising:
a fastener comprising:
a head;
a cylindrical shank that extends from the head, has a smooth surface, and is dimensioned to engage in a fit with a corresponding hole; and
a coating that is discontinuously speckled around a circumference of the shank on top of the smooth surface, is bonded to the smooth surface, and extends axially along the shank, leaving unpatterned portions of a surface of the shank exposed,
the coating exhibits a higher lubricity than the surface, and
the coating exhibits a higher dielectric withstand voltage than the surface, wherein the unpatterned portions are randomly shaped.

2. The apparatus of claim 1 wherein:
coverage of the surface by the coating forms an unpatterned mosaic.

3. The apparatus of claim 1 wherein:
the fastener comprises a pull-type lock bolt.

4. The apparatus of claim 1 wherein:
the coating is discontinuously speckled over an entire circumference of the shank.

5. The apparatus of claim 1 wherein:
the coating covers between thirty and seventy percent of a surface area of the shank.

6. The apparatus of claim 1 wherein:
coverage of the surface by the coating increases a width of the shank by less than one hundredth of an inch.

7. The apparatus of claim 1 wherein:
the coating is fused to the shank.

8. The apparatus of claim 1 wherein:
a percentage of surface area of the shank covered by the coating remains constant on average as the circumference of the shank is traversed.

* * * * *